United States Patent
Cho et al.

(10) Patent No.: US 9,517,460 B2
(45) Date of Patent: *Dec. 13, 2016

(54) METHOD FOR FABRICATING HOLLOW METAL NANO PARTICLES SUPPORTED ON CARRIER

(71) Applicant: LG CHEM, LTD., Seoul (KR)

(72) Inventors: Jun Yeon Cho, Daejeon (KR); Sang Hoon Kim, Daejeon (KR); Gyo Hyun Hwang, Daejeon (KR); Kwanghyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/649,446

(22) PCT Filed: Dec. 27, 2013

(86) PCT No.: PCT/KR2013/012288
§ 371 (c)(1),
(2) Date: Jun. 3, 2015

(87) PCT Pub. No.: WO2014/104806
PCT Pub. Date: Jul. 3, 2014

(65) Prior Publication Data
US 2015/0328629 A1    Nov. 19, 2015

(30) Foreign Application Priority Data
Dec. 27, 2012  (KR) .................. 10-2012-0155420

(51) Int. Cl.
*B01J 37/00* (2006.01)
*B01J 23/89* (2006.01)
(Continued)

(52) U.S. Cl.
CPC ........... *B01J 37/0072* (2013.01); *B01J 23/892* (2013.01); *B01J 35/023* (2013.01);
(Continued)

(58) Field of Classification Search
CPC ... B22F 1/0051; B22F 2001/0029; B22F 9/24; B22F 2009/245; B22F 2304/054; C01P 2004/34; C01P 2004/51; C01P 2004/64
(Continued)

(56) References Cited

U.S. PATENT DOCUMENTS 3,798,176 A * 3/1974 Ao ............................ B01J 23/26
502/210
4,576,926 A * 3/1986 Wang ...................... B01J 37/024
502/325
(Continued)

FOREIGN PATENT DOCUMENTS

CN          1476413 A    2/2004
CN        101501790 A    8/2009
(Continued)

OTHER PUBLICATIONS

"Shape controlled synthesis of iron-cobalt alloy magnetic nanoparticles using soft template method," Santosh K. Pal et al. Materials Letters 64 (2010), pp. 1127-1129.*
(Continued)

*Primary Examiner* — Patricia L Hailey
(74) *Attorney, Agent, or Firm* — Dentons US LLP

(57) ABSTRACT

The present application relates to a method for fabricating hollow nano particles supported on carrier.

51 Claims, 11 Drawing Sheets

(51) Int. Cl.
*B01J 37/16* (2006.01)
*B01J 35/02* (2006.01)
*B22F 9/24* (2006.01)
*B82B 3/00* (2006.01)
*B82Y 40/00* (2011.01)
*B22F 1/00* (2006.01)

(52) U.S. Cl.
CPC ............ *B01J 35/026* (2013.01); *B01J 37/16* (2013.01); *B22F 9/24* (2013.01); *B82B 3/00* (2013.01); *B22F 2001/0029* (2013.01); *B82Y 40/00* (2013.01)

(58) Field of Classification Search
USPC .................. 502/182, 185, 300; 428/402, 403
See application file for complete search history.

(56) References Cited

U.S. PATENT DOCUMENTS

| | | | | |
|---|---|---|---|---|
| 4,701,436 | A * | 10/1987 | Wang .................. | B01J 37/024 502/325 |
| 4,804,796 | A * | 2/1989 | Wang .................. | B01J 35/08 208/300 |
| 5,256,616 | A * | 10/1993 | Heller .................. | B01J 35/004 428/404 |
| 5,763,351 | A * | 6/1998 | Ichimura ............. | B01J 23/8892 428/403 |
| 6,573,213 | B1 * | 6/2003 | Ostgard .................. | B01J 25/02 502/301 |
| 6,752,979 | B1 | 6/2004 | Talbot et al. | |
| 8,293,677 | B2 * | 10/2012 | Miura .................. | B01D 53/945 423/213.2 |
| 8,912,114 | B2 * | 12/2014 | Mukerjee ............. | H01M 4/921 502/182 |
| 8,992,660 | B2 * | 3/2015 | Cho ...................... | B22F 1/0051 75/370 |
| 9,138,727 | B2 * | 9/2015 | Greenlee ................ | B01J 23/755 |
| 2005/0075240 | A1 * | 4/2005 | Yamamoto .......... | H01M 4/8605 502/101 |
| 2010/0143721 | A1 * | 6/2010 | Chen ........................ | B01J 23/06 428/407 |
| 2010/0233578 | A1 | 9/2010 | Jang et al. | |
| 2010/0258759 | A1 | 10/2010 | Archer et al. | |
| 2011/0129763 | A1 | 6/2011 | Lee et al. | |
| 2011/0207019 | A1 | 8/2011 | Mukerjee | |
| 2014/0356623 | A1 * | 12/2014 | Yu .......................... | C01B 33/18 428/402 |
| 2016/0015652 | A1 * | 1/2016 | John et al. ............... | B01J 13/22 424/490 |

FOREIGN PATENT DOCUMENTS

| | | |
|---|---|---|
| CN | 101937999 A | 1/2011 |
| DE | 10-2007-023491 A1 | 11/2008 |
| JP | 2004-057954 A | 2/2004 |
| JP | 2004-224673 A | 8/2004 |
| JP | 2006-045582 A | 2/2006 |
| JP | 2010-511997 A | 4/2010 |
| JP | 2010-214330 A | 9/2010 |
| KR | 10-2005-0098818 A | 10/2005 |
| KR | 10-2010-0011029 A | 2/2010 |
| KR | 10-2011-0040006 A | 4/2011 |
| KR | 10-2011-0060589 A | 6/2011 |
| KR | 10-2012-0098354 A | 9/2012 |
| WO | 0242201 A1 | 5/2002 |

OTHER PUBLICATIONS

Kim et al., Applied Catlysis B: Environmental, "Facile Fabrication of Hollow PT/AG Nanocomposites Having Enhanced Catalytic Properties," vol. 03, 2011 pp. 253-260.

Zhao et al., International Journal of Hydrogen Energy, "Methanol Electro-Oxidation on Ni@Pd Core-Shell Nanoparticles Supported on Multi-Walled Carbon Nanotubes in Alkaline Media," vol. 35, 2010, pp. 3249-3257.

PAL: "Shape controlled synthesis of iron-cobalt alloy magnetic nanoparticles using soft template method", Materials Letters, vol. 84, 2010, pp. 1127-1129.

* cited by examiner

METHOD FOR FABRICATING HOLLOW METAL NANO PARTICLES SUPPORTED ON CARRIER

TECHNICAL FIELD

This application is a National Stage Entry of International Application No. PCT/KR2013/012288, filed on Dec. 27, 2013, and claims the benefit of Korean Application No. 10-2012-0155420, filed on Dec. 27, 2012, all of which are hereby incorporated by reference in their entirety for all purposes as if fully set forth herein

BACKGROUND ART

Nano particles are particles having a nano-scaled particle size, and exhibit optical, electric, and magnetic characteristics completely different from those of a bulk-state material due to a quantum confinement effect in which the energy required for electron transfer is changed depending on the size of material, and a large specific surface area. Thus, due to these properties, much interests have been focused on the applicability in the fields of catalysts, electro-magnetics, optics, medicine, and the like. Nano particles may be an intermediate between bulk and molecule, and in terms of an approach in two ways, that is, a "Top-down" approach and a "Bottom-up" approach, it is possible to synthesize nano particles.

Examples of a method for synthesizing metal nano particles include a method using gamma rays, an electrochemical method, and the like. However, methods in the related art are problematic in that it is difficult to synthesize nano particles having a uniform size and shape, or the use of an organic solvent leads to environmental pollution, high costs, and the like. For these various reasons, it was difficult to economically mass-produce high-quality nano particles.

Meanwhile, in order to fabricate hollow metal nano particles in the related art, hollow metal nano particles have been fabricated by synthesizing particles with a low reduction potential, such as Ag, Cu, Co, and Ni, substituting the surface of particles, such as Ag, Cu, Co, Ni, or the like with a metal having a higher reduction potential than the particles with a low reduction potential, for example, Pt, Pd, or Au by a potential difference substitution method, and after the surface substitution, melting Ag, Cu, Co, Ni, and the like remaining inside the particles through an acid treatment. In this case, there is a problem in the process in that a post-treatment needs to be performed with an acid. Since the potential difference substitution method is a natural reaction, there are a few factors that may be controlled, and thus it is difficult to fabricate uniform particles. Therefore, there is a need for a method for fabricating uniform hollow metal nano particles, which is easier than the methods in the related art.

RELATED ART DOCUMENT

Korean Patent Application Laid-Open No. 10-2005-0098818

DETAILED DESCRIPTION OF THE INVENTION

Technical Problem

An object of the present application is to provide a fabrication method of high-quality hollow metal nano particles having a uniform size, which are supported on a carrier and may facilitate mass production at relatively inexpensive costs without environmental pollution.

Technical Solution

An exemplary embodiment of the present application provides a method for fabricating hollow metal nano particles supported on a carrier, the method including: forming a solution by adding a first metal salt, a second metal salt, and a surfactant to a solvent; forming hollow metal nano particles by adding a reducing agent to the solution; and supporting the hollow metal nano particles on a carrier, in which the forming of the solution includes forming a micelle by the surfactant, and surrounding the outside of the micelle by the first metal salt and the second metal salt, and the forming of the hollow metal nano particles includes forming the micelle region to a hollow form.

Further, an exemplary embodiment of the present application provides a method for fabricating hollow metal nano particles supported on a carrier, the method including: forming a composition by adding a carrier, a first metal salt, a second metal salt, and a surfactant to a solvent; and forming hollow metal nano particles supported on the carrier by adding a reducing agent to the composition, in which the forming of the solution includes forming a micelle by the surfactant, and surrounding the outside of the micelle by the first metal salt and the second metal salt, and the hollow metal nano particle includes a hollow form formed by the micelle region.

Advantageous Effects

The present application has the merit of providing hollow metal nano particles having a uniform size of several nanometers and being applied in various fields because hollow metal nano particles may be fabricated directly on a carrier, and thus adhesion force or bonding force between the carrier and the hollow metal nano particles is excellent.

BEST MODE

Figure 1:
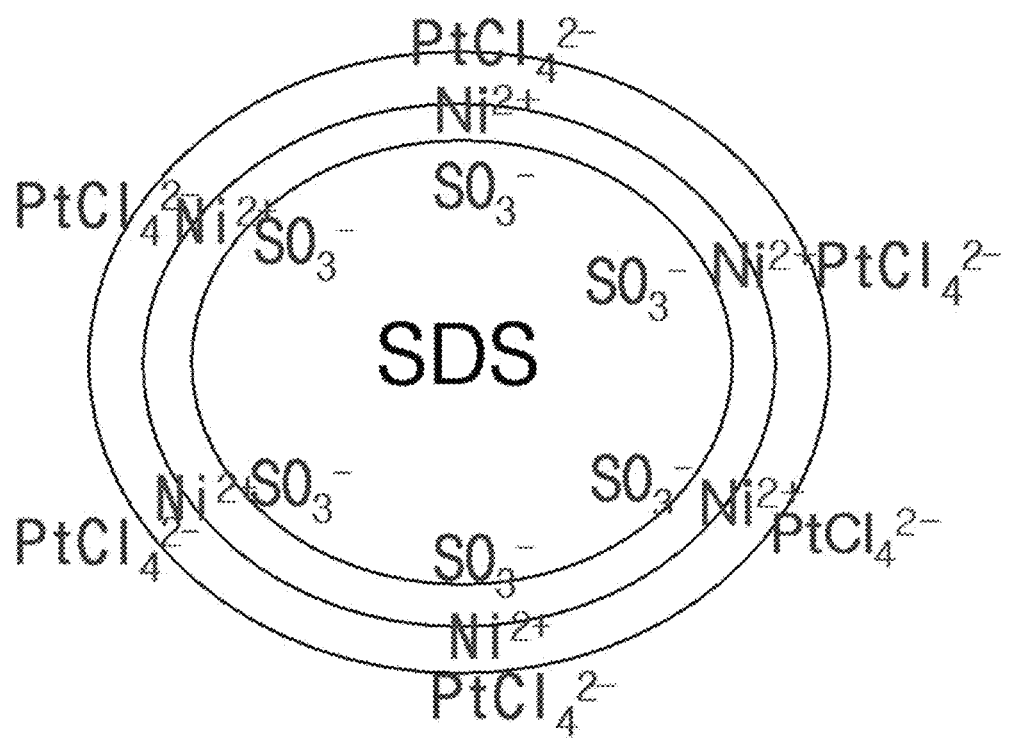
FIG. 1 illustrates a model of hollow metal nano particles, which includes a surfactant, among hollow metal nano particles supported on a carrier which are fabricated according to Example 1.

Hereinafter, the present specification will be described in more detail.

In the present specification, hollowness means that the core portions of hollow metal nano particles are empty. In addition, hollowness may also be used to have the same meaning as a hollow core. Hollowness includes the terms of hollow, hole, void, and porous. Hollowness may include a space in which an internal material is not present by 50% by volume or more, specifically 70% by volume or more, and more specifically 80% by volume or more. Furthermore, hollowness may also include a space of which the inside is empty by 50% by volume or more, specifically 70% by volume or more, and more specifically 80% by volume or more. Further, hollowness includes a space having an internal porosity of 50% by volume or more, specifically 70% by volume or more, and more specifically 80% by volume.

An exemplary embodiment of the present application provides a method for fabricating hollow metal nano particles supported on a carrier, the method including: forming a solution by adding a first metal salt, a second metal salt, and a surfactant to a solvent; forming hollow metal nano particles by adding a reducing agent to the solution; and supporting the hollow metal nano particles on a carrier, in which the forming of the solution includes forming a micelle by the surfactant, and surrounding the outside of the micelle by the first metal salt and the second metal salt, and the forming of the hollow metal nano particles includes forming the micelle region to a hollow form.

According to an exemplary embodiment of the present application, the supporting of the hollow metal nano particles on a carrier may be adding the carrier after the forming of the hollow metal nano particles.

In addition, an exemplary embodiment of the present application provides a method for fabricating hollow metal nano particles supported on a carrier, the method including: forming a composition by adding a carrier, a first metal salt, a second metal salt, and a surfactant to a solvent; and forming hollow metal nano particles supported on the carrier by adding a reducing agent to the composition, in which the forming of the solution includes forming a micelle by the surfactant, and surrounding the outside of the micelle by the first metal salt and the second metal salt, and the hollow metal nano particle includes a hollow form formed by the micelle region.

According to an exemplary embodiment of the present application, the forming of the composition may be mixing a solution, which is formed by adding the first metal salt, the second metal salt, and the surfactant to the solvent, with the carrier.

According to an exemplary embodiment of the present application, the forming of the composition may be adding the carrier to a solution formed by adding the first metal salt, the second metal salt and the surfactant to the solvent and dispersing the composition.

According to an exemplary embodiment of the present application, the carrier may be a solution in which the carrier is dispersed in the solvent.

Specifically, according to an exemplary embodiment of the present application, the forming of the hollow metal nano particles supported on a carrier may be adding the carrier to the solution before adding the reducing agent, or adding a first metal salt, a second metal salt, and a surfactant to a solution including a carrier. That is, according to the fabrication method according to an exemplary embodiment of the present application, the hollow metal nano particles may be fabricated on a carrier. In this case, since the carrier is added at the intermediate step of the fabrication method, adhesion force between the hollow metal nano particles fabricated and the carrier is enhanced, so that there is an advantage in that stability of the hollow metal nano particles is excellent.

According to the fabrication method according to an exemplary embodiment of the present application, there is also an advantage in that the dispersion degree of the hollow metal nano particles on a carrier is excellent. The higher the dispersion degree is, the more activation points which may participate in a reaction are, so that there is an effect in that reactivity is improved. Further, since the interaction between hollow metal nano particles and the carrier is improved, there is an advantage in that durability may be enhanced.

The fabrication method according to an exemplary embodiment of the present application does not use a reduction potential difference, and thus is advantageous in that a reduction potential between a first metal and a second metal is not considered. The fabrication method uses charges between metal ions and thus is advantageous in that the method is simpler than the fabrication method in the related art, and thus facilitates mass production.

Further, according to the fabrication method according to an exemplary embodiment of the present application, there is an advantage in that the hollow metal nano particles may be synthesized directly on a carrier.

The forming of the solution may include further adding a stabilizer. According to an exemplary embodiment of the present application, the stabilizer may include one or two or more selected from the group consisting of disodium phosphate, dipotassium phosphate, disodium citrate, and trisodium citrate.

In an exemplary embodiment of the present application, the first metal salt is not particularly limited as long as the first metal salt may be ionized in a solution to provide metal ions for the first metal. The first metal salt may include the first metal. Here, the first metal may be different from a second metal.

According to an exemplary embodiment of the present application, the first metal of the first metal salt may be selected from the group consisting of metals belonging to Group 3 to Group 15 of the periodic table, metalloids, lanthanide metals, and actinide metals, and specifically, may be at least one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W)), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). More specifically, the first metal may be selected from the group consisting of ruthenium (Ru), rhodium (Rh), molybdenum (Mo), osmium (Os), iridium (Ir), rhenium (Re), palladium (Pd), vanadium (V), tungsten (W)), cobalt (Co), iron (Fe), selenium (Se), nickel (Ni), bismuth (Bi), tin (Sn), chromium (Cr), titanium (Ti), cerium (Ce), silver (Ag), and copper (Cu), and further more specifically, may be nickel (Ni).

In an exemplary embodiment of the present application, the second metal salt is not particularly limited as long as the second metal salt may be ionized in a solution to provide metal ions for the second metal. The second metal salt may include the second metal. Here, the second metal may be different from the first metal.

According to an exemplary embodiment of the present application, the second metal of the second metal salt may be selected from the group consisting of metals belonging to Group 3 to Group 15 of the periodic table, metalloids, lanthanide metals, and actinide metals, and specifically, may be one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W)), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). More specifically, the second metal may be selected from the group consisting of platinum (Pt), palladium (Pt), and gold (Au), and even more specifically, may be platinum (Pt).

In an exemplary embodiment of the present application, the first metal salt and the second metal salt may be each of nitrate ($NO_3^-$), halide such as chloride ($Cl^-$), bromide ($Br^-$), and iodide ($I^-$), hydroxide ($OH^-$), or sulfate ($SO_4^-$) of the first metal and the second metal, but are not limited thereto.

According to an exemplary embodiment of the present application, the first metal and the second metal may form the hollow metal nano particles. Specifically, the first metal and the second metal may form a shell portion of the hollow metal nano particles, and the shell portion may include a first shell and a second shell.

Specifically, according to an exemplary embodiment of the present application, the shell portion may be formed of the first shell including the first metal and the second shell including the second metal.

Further, according to an exemplary embodiment of the present application, the first shell and the second shell may include different metals.

Alternatively, the shell portion of the present specification may include one shell including the first metal and the second metal.

The second metal salt may also form a second shell, and may also form the second metal salt which is mixed with the first metal salt to form the first shell.

The shell portion of the present application may be present over an entire surface outside the hollow portion, and may also be present in the form of surrounding the hollow portion. Specifically, according to an exemplary embodiment of the present application, the shell portion may be formed throughout the outer side surface of hollow core portion. That is, the shell portion of the present application may constitute the forms of the hollow metal nano particle.

According to an exemplary embodiment of the present application, the shell portion of the hollow metal nano particle may be formed of a metal including the first metal and the second metal. That is, the shell portion of the hollow metal nano particles of the present application may be formed of a metal instead of a metal oxide.

According to an exemplary embodiment of the present application, the hollow metal nano particles may have a spherical shape. In this case, the form of the shell portion of the present application may have a spherical shape including a hollow core.

The spherical shape of the present application does not mean only a completely spherical shape, and may include an approximately spherical shape. For example, in the hollow metal nano particles, the spherically shaped outer surface may not be flat, and the radius of curvature in one hollow metal nano particle may not be uniform.

According to an exemplary embodiment of the present application, the first metal salt may be in the form that surrounds the outer surface of a surfactant forming a micelle. In addition, the second metal salt may be in the form that surrounds the first metal salt. The first metal salt and the second metal salt may form shell portions including the first metal and the second metal, respectively, by a reducing agent.

In an exemplary embodiment of the present application, the molar ratio of the first metal salt to the second metal salt may be 1:5 to 10:1, specifically, 2:1 to 5:1. When the mole number of the first metal salt is smaller than the mole number of the second metal salt, it is difficult for the first metal to form a first shell including hollow portions. Furthermore, when the mole number of the first metal salt exceeds the mole number of the second metal salt by 10 times, it is difficult for the second metal salt to form a second shell that surrounds the first shell.

According to an exemplary embodiment of the present application, the atomic percentage ratio of the first metal to the second metal of the shell portion may be 1:5 to 10:1. When the shell portion is formed of the first shell and the second shell, the atomic percentage ratio may be an atomic percentage ratio of the first metal of the first shell to the second metal of the second shell. Alternatively, the atomic percentage ratio may be an atomic percentage ratio of the first metal to the second metal when the shell portion is formed of one shell including the first metal and the second metal.

According to an exemplary embodiment of the present application, when the shell portion is formed of one shell including the first metal and the second metal, the first metal and the second metal may also be mixed uniformly or non-uniformly.

Alternatively, according to an exemplary embodiment of the present application, the shell portion may be present in a state where the first metal and the second metal are gradated, the first metal may be present in an amount of 50% by volume or more, or 70% by volume or more at a portion adjacent to the hollow core in the shell portion, and the second metal may be present in an amount of 50% by volume or 70% by volume or more at a surface portion adjacent to the outer portion of nano particles in the shell portion.

According to an exemplary embodiment of the present application, the solvent may be a solvent including water. Specifically, in an exemplary embodiment of the present application, the solvent serves to dissolve the first metal salt and the second metal salt, and may be water or a mixture of water and a $C_1$ to $C_6$ alcohol, specifically, water. Since the present application does not use an organic solvent as a solvent, the present application does not require a post-treatment process of treating an organic solvent in the fabrication process, and thus there are effects of reducing costs and preventing environmental pollution.

According to an exemplary embodiment of the present application, the surfactant may form a micelle in the solution. It is possible to classify electric charges of the surfactant depending on the type of electric charge on the outer side of the micelle. That is, when the electric charge on the outer side of the micelle is anionic, the surfactant forming the micelle may be an anionic surfactant. Further, when the electric charge on the outer side of the micelle is cationic, the surfactant forming the micelle may be a cationic surfactant.

In an exemplary embodiment of the present application, the surfactant may be an anionic surfactant. Specifically, the surfactant may be selected from the group consisting of potassium laurate, triethanolamine stearate, ammonium lauryl sulfate, lithium dodecyl sulfate, sodium lauryl sulfate, sodium dodecyl sulfate, alkyl polyoxyethylene sulfates, sodium alginate, dioctyl sodium sulfosuccinate, phosphatidyl glycerol, phosphatidyl inositol, phosphatidylserine, phosphatidic acid and salts thereof, glyceryl ester, sodium carboxymethylcellulose, bile acid and salts thereof, cholic acid, deoxycholic acid, glycocholic acid, taurocholic acid, glycodeoxycholic acid, alkyl sulfonate, aryl sulfonate, alkyl phosphate, alkyl phosphonate, stearic acid and salts thereof, calcium stearate, phosphate, sodium carboxymethyl cellulose, dioctyl sulfosuccinate, dialkyl ester of sodium sulfosuccinic acid, phospholipid and calcium carboxymethyl cellulose.

When the surfactant is an anionic surfactant, the outer side of the surfactant forming the micelle is anionically charged, and thus may be surrounded by the first metal salt that is cationally charged. Furthermore, the first metal salt may be surrounded by the second metal salt that is anionically charged.

According to an exemplary embodiment of the present application, the first metal salt that is cationically charged and the second metal salt that is anionically charged are not present in a region where the anionic surfactant forms a micelle, thereby forming hollow portions. That is, when the first metal salt and the second metal salt are formed of a shell portion including the first metal and the second metal by a reducing agent, the region constituting the micelle may become a hollow core that does not include a metal.

In an exemplary embodiment of the present application, the surfactant may be a cationic surfactant. Specifically, the cationic surfactant may be selected from the group consisting of quaternary ammonium compounds, benzalkonium chloride, cetyl trimethyl ammonium bromide, chitonic acid, lauryl dimethyl benzyl ammonium chloride, acyl carnitine hydrochloride, alkyl pyridinium halide, cetylpyridinium chloride, cationic lipids, polymethylmethacrylate trimethyl ammonium bromide, sulfonium compounds, polyvinylpyrrolidone-2-dimethylaminoethyl methacrylate dimethyl sulfate, hexadecyl trimethyl ammonium bromide, phosphonium compounds, benzyl-di(2-chloroethyl)ethyl ammonium bromide, coconut trimethyl ammonium chloride, coconut trimethyl ammonium bromide, coconut methyl dihydroxyethyl ammonium chloride, coconut methyl dihydroxyethyl ammonium bromide, decyl triethyl ammonium chloride, decyl dimethyl hydroxyethyl ammonium chloride bromide, $C_{12-15}$-dimethyl hydroxyethyl ammonium chloride, $C_{12-15}$-dimethyl hydroxyethyl ammonium chloride bromide, coconut dimethyl hydroxyethyl ammonium chloride, coconut dimethyl hydroxyethyl ammonium bromide, myristyl trimethyl ammonium methyl sulphate, lauryl dimethyl benzyl ammonium chloride, lauryl dimethyl benzyl ammonium bromide, lauryl dimethyl (ethenoxy)$_4$ ammonium chloride, lauryl dimethyl (ethenoxy)$_4$ ammonium bromide, N-alkyl ($C_{12-18}$)dimethylbenzyl ammonium chloride, N-alkyl ($C_{14-18}$)dimethyl-benzyl ammonium chloride, N-tetradecyl dimethylbenzyl ammonium chloride monohydrate, dimethyl didecyl ammonium chloride, N-alkyl ($C_{12-14}$) dimethyl 1-napthylmethyl ammonium chloride, trimethylammonium halide alkyl-trimethylammonium salts, dialkyl-dimethylammonium salts, lauryl trimethyl ammonium chloride, ethoxylated alkyamidoalkyldialkylammonium salts, ethoxylated trialkyl ammonium salts, dialkylbenzene dialkylammonium chloride, N-didecyldimethyl ammonium chloride, N-tetradecyldimethylbenzyl ammonium chloride monohydrate, N-alkyl($C_{12-14}$) dimethyl 1-naphthylmethyl ammonium chloride, dodecyldimethylbenzyl ammonium chloride, dialkyl benzenealkyl ammonium chloride, lauryl trimethyl ammonium chloride, alkylbenzyl methyl ammonium chloride, alkyl benzyl dimethyl ammonium bromide, $C_{12}$ trimethyl ammonium bromides, $C_{15}$ trimethyl ammonium bromides, $C_{17}$ trimethyl ammonium bromides, dodecylbenzyl triethyl ammonium chloride, polydiallyldimethylammonium chloride, dimethyl ammonium chlorides, alkyldimethylammonium halogenides, tricetyl methyl ammonium chloride, decyltrimethylammonium bromide, dodecyltriethylammonium bromide, tetradecyltrimethylammonium bromide, methyl trioctylammonium chloride, POLYQUAT 10, tetrabutylammonium bromide, benzyl trimethylammonium bromide, choline esters, benzalkonium chloride, stearalkonium chloride, cetyl pyridinium bromide, cetyl pyridinium chloride, halide salts of quaternized polyoxyethylalkylamines, "MIRAPOL" (polyquaternium-2), "Alkaquat" (alkyl dimethyl benzylammonium chloride, manufactured by Rhodia), alkyl pyridinium salts, amines, amine salts, imide azolinium salts, protonated quaternary acrylamides, methylated quaternary polymers, and cationic gua gum, benzalkonium chloride, dodecyl trimethyl ammonium bromide, triethanolamine, and poloxamines.

When the surfactant is a cationic surfactant, the outer side of the surfactant forming the micelle is cationically charged, and thus may be surrounded by the first metal salt that is anionically charged. Furthermore, the first metal salt may be surrounded by the second metal salt that is cationically charged.

According to an exemplary embodiment of the present application, the first metal salt that is anionically charged and the second metal salt that is cationically charged are not present in a region where the cationic surfactant forms a micelle, thereby forming hollow portions. That is, when the first metal salt and the second metal salt are formed of a shell portion including the first metal and the second metal by a reducing agent, the region constituting the micelle may become a hollow core that does not include a metal.

According to an exemplary embodiment of the present invention, the forming of the solution may be further adding a non-ionic surfactant.

In an exemplary embodiment of the present application, specifically, the non-ionic surfactant may be selected from the group consisting of polyoxyethylene fatty alcohol ether, polyoxyethylene sorbitan fatty acid ester, polyoxyethylene fatty acid ester, polyoxyethylene alkyl ether, polyoxyethylene castor oil derivatives, sorbitan ester, glyceryl ester, glycerol monostearate, polyethylene glycol, polypropylene glycol, polypropylene glycol ester, cetyl alcohol, cetostearyl alcohol, stearyl alcohol, aryl alkyl polyether alcohol, polyoxyethylene polyoxypropylene copolymers, poloxamer, poloxamine, methylcellulose, hydroxycellulose, hydroxymethylcellulose, hydroxyethylcellulose, hydroxypropylcellulose, hydroxypropylmethylcellulose, hydroxypropylmethylcellulose phthalate, noncrystalline cellulose, polysaccharides, starch, starch derivatives, hydroxyethyl starch, polyvinyl alcohol, triethanolamine stearate, amine oxide, dextran, glycerol, gum acacia, cholesterol, tragacanth, and polyvinylpyrrolidone.

The non-ionic surfactant is adsorbed on the surface of the shell, and thus serves to uniformly disperse the hollow metal nano particles formed in the solution. Thus, the non-ionic surfactant may prevent hollow metal particles from being conglomerated or aggregated so as to be precipitated and allow hollow metal nano particles to be formed in a uniform size.

In an exemplary embodiment of the present application, the concentration of the surfactant in the solution may be 0.2 time or more and 5 times or less the critical micelle concentration (CMC) to the solvent. For example, the concentration may be one time the CMC.

Specifically, in an exemplary embodiment of the present application, when water is selected as the solvent, the concentration of the surfactant in the solution may be 0.2 time or more and 5 times or less the critical micelle concentration (CMC) to water.

When the concentration of the surfactant is less than 0.2 time the critical micelle concentration, hollow particles may not be formed because the surfactant fails to form a micelle. Meanwhile, when the concentration of the surfactant exceeds 5 times the critical micelle concentration, rod-like particles or plate-like particles may be formed instead of sphere-like particles, and hollow metal nano particles may not be formed.

According to an exemplary embodiment of the present application, it is possible to control the size of the hollow metal nano particles by controlling the surfactant which forms the micelle and/or the first and second metal salts which surround the micelle.

According to an exemplary embodiment of the present application, it is possible to control the size of hollow metal nano particles by controlling the chain length of the surfactant which forms the micelle. Specifically, when the chain length of the surfactant is short, the size of the micelle may be decreased and the hollow size may also be decreased, thereby decreasing the size of the hollow metal nano particles.

According to an exemplary embodiment of the present application, the carbon number of the chains of the surfactant may be 15 or less. Specifically, the carbon number of the chain may be 8 or more and 15 or less. Alternatively, the carbon number of the chain may be 10 or more and 12 or less.

According to an exemplary embodiment of the present application, it is possible to control the size of hollow metal nano particles by controlling the type of counter ion of the surfactant which forms the micelle. Specifically, as the size of the counter ion of the surfactant is increased, the bonding strength of the outer end of the surfactant with the head portion thereof becomes weak, and thus the size of hollow portions may be increased. Accordingly, the size of hollow metal nano particles may be increased.

According to an exemplary embodiment of the present specification, when the surfactant is an anionic surfactant, the surfactant may include $NH_4^+$, $K^+$, $Na^+$, or $Li^+$ as a counter ion.

Specifically, the size of hollow nano particles may be decreased when the counter ion of the surfactant is $NH_4^+$, $K^+$, $Na^+$, or $Li^+$ in this order. This may be confirmed by the Examples to be described below.

According to an exemplary embodiment of the present specification, when the surfactant is a cationic surfactant, the surfactant may include $I^-$, $Br^-$, or $Cl^-$ as a counter ion. Specifically, the size of the hollow nano particles may be decreased when the counter ion of the surfactant is $I^-$, $Br^-$, or $Cl^-$ in this order.

According to an exemplary embodiment of the present application, it is possible to control the size of hollow metal nano particles by controlling the size of the head portion of the surfactant which forms the micelle. Furthermore, when the size of the head portion of the surfactant formed on the outer surface of the micelle is increased, the repulsive force between head portions of the surfactant is increased, and thus the size of hollow portions may be increased. Accordingly, the size of hollow metal nano particles may be increased.

According to an exemplary embodiment of the present application, the size of hollow metal nano particles may be determined by complex action of the factors as described above.

According to an exemplary embodiment of the present application, the fabrication method may be carried out at room temperature. That is, each step of the fabrication method may be carried out at room temperature. Specifically, the fabrication method may be carried out at a temperature in a range from 4° C. to 35° C., more specifically, at 15° C. to 28° C.

In an exemplary embodiment of the present application, the forming of the solution may be carried out at a temperature in a range specifically from 4° C. to 35° C., more specifically, from 15° C. to 28° C. When an organic solvent is used as the solvent, there is a problem in that fabrication method is performed at a high temperature exceeding 100° C. Since the fabrication method may be carried out at room temperature, the present application is advantageous in terms of process due to a simple fabrication method, and has a significant effect of reducing costs.

In an exemplary embodiment of the present application, the forming of the solution may be performed for 5 minutes to 120 minutes, more specifically for 10 minutes to 90 minutes, and even more specifically for 20 minutes to 60 minutes.

According to an exemplary embodiment of the present application, the supporting of the hollow metal nano particles on a carrier may be adding dropwise a liquid dispersion of the hollow metal nano particles to a liquid dispersion of the carrier, and then stirring the mixture, after the hollow metal nano particles are fabricated.

According to an exemplary embodiment of the present application, the supporting of the hollow metal nano particles on a carrier may be carried out at room temperature. Specifically, the supporting of the hollow metal nano particles on a carrier may be carried out at a temperature in a range specifically from 4° C. to 35° C., more specifically, from 15° C. to 28° C.

In an exemplary embodiment of the present application, the dispersing of the composition by adding the carrier may be carried out at room temperature, specifically, at a temperature in a range from 4° C. to 35° C. Since the fabrication method may be carried out at room temperature, the present application is advantageous in terms of process due to a simple fabrication method, and has a significant effect of reducing costs.

In an exemplary embodiment of the present application, the dispersing of the composition may be carried out by stirring the mixture for 5 minutes to 120 minutes, more specifically for 10 minutes to 90 minutes, and even more specifically for 20 minutes to 60 minutes.

Since the first metal salt and the second metal salt are dispersed in the carrier before the hollow metal nano particles are formed, the fabrication method according to an exemplary embodiment of the present application is advantageous in that metal salts are uniformly dispersed. Thus, when hollow metal nano particles are formed, particles are less aggregated. Further, the fabrication method is advantageous in that adhesion force or bonding force between the hollow metal nano particles and the carrier is improved.

In an exemplary embodiment of the present application, a carbon-based material or an inorganic fine particle may be used as the carrier. As the carbon-based material, it is possible to use one selected from the group consisting of carbon black, carbon nano tube (CNT), graphite, graphene, activated carbon, mesoporous carbon, carbon fiber and carbon nano wire, and examples of the carbon black include denka black, ketjen black or acetylene black. As the inorganic fine particle, it is also possible to use one selected from the group consisting of alumina, silica, titania and zirconia.

In an exemplary embodiment of the present application, the forming of the hollow metal nano particles by adding a reducing agent to the solution; and the forming of the hollow metal nano particles supported on a carrier by adding a reducing agent to the solution may also be carried out at room temperature, at a temperature in a range specifically from 4° C. to 35° C., more specifically, from 15° C. to 28° C. Since the fabrication method may be carried out at room temperature, the present application is advantageous in terms of process due to a simple fabrication method, and has a significant effect of reducing costs.

The forming of the hollow metal nano particles may be performed by reacting the solution with the reducing agent for a predetermined time, specifically for 5 minutes to 120 minutes, more specifically for 10 minutes to 90 minutes, and even more specifically for 20 minutes to 60 minutes.

In an exemplary embodiment of the present application, the reducing agent is not particularly limited as long as the reducing agent is a strong reducing agent having a standard reduction potential of −0.23 V or less, specifically from −4 V to −0.23 V, and has a reducing power which may reduce the dissolved metal ions to be precipitated as metal particles.

Such a reducing agent may be at least one selected from the group consisting of, for example, $NaBH_4$, $NH_2NH_2$, $LiAlH_4$, and $LiBEt3H$.

When a weak reducing agent is used, a reaction speed is slow and subsequent heating of the solution is required such that it is difficult to achieve a continuous process, and thus there may be a problem in terms of mass production. In particular, when ethylene glycol, which is one of the weak reducing agents, is used, there is a problem in that the productivity is low in a continuous process due to a decrease in flow rate caused by high viscosity.

In an exemplary embodiment of the present application, the fabrication method may further include, after the forming of the hollow metal nano particles, removing a surfactant inside the hollow portions. The removing method is not particularly limited, and for example, a method of washing the surfactant with water may be used. The surfactant may be an anionic surfactant or a cationic surfactant.

According to the fabrication method according to an exemplary embodiment of the present application, the fabrication method may further add performing a filtering process using a centrifuge after washing or a filter after washing, after forming a composition by adding a carrier, a first metal salt, a second metal salt, and a surfactant to a solvent; and forming hollow metal nano particles supported on a carrier by adding a reducing agent to the composition.

Further, according to the fabrication method according to an exemplary embodiment of the present application, the fabrication method may further add performing a filtering process using a centrifuge after washing or a filter after washing, after forming a solution by adding a first metal salt, a second metal salt, and a surfactant to a solvent; forming hollow metal nano particles by adding a reducing agent to the solution; and supporting the hollow metal nano particles on a carrier by adding the carrier to the solution.

In an exemplary embodiment of the present application, the particle diameter of a plurality of hollow metal nano particles to be formed may be within a range from 80% to 120% of the average particle diameter of the hollow metal nano particles. Specifically, the particle diameter of the hollow metal nano particles may be within a range from 90% to 110% of the average particle diameter of hollow metal nano particles. When the particle diameter exceeds the range, the size of the hollow metal nano particles is overall irregular, and thus it may be difficult to secure an intrinsic physical property value required by the hollow metal nano particles. For example, when hollow metal nano particles exceeding a range from 80% to 120% of the average particle diameter of the hollow metal nano particles are used as a catalyst, the activity of the catalyst may be a little insufficient.

According to an exemplary embodiment of the present application, it is possible to fabricate hollow metal nano particles having a uniform size of a few nanometers. By methods in the related art, it has been difficult to fabricate a few nanometer-sized hollow metal nano particles, and it has been more difficult to fabricate uniform-sized hollow metal nano particles.

In an exemplary embodiment of the present application, the hollow metal nano particles may have an average particle diameter of 30 nm or less, more specifically 20 nm or less, or 10 nm or less. Alternatively, the hollow metal nano particles may have an average particle diameter of 6 nm or less. The hollow metal nano particles may have an average particle diameter of 1 nm or more. When the hollow metal nano particles have a particle diameter of 30 nm or less, the nano particles are advantageous in that the nano particles may be used in various fields. Further, when the hollow metal nano particles have a particle diameter of 20 nm or less, the hollow metal nano particles are more preferred. In addition, when the hollow metal nano particles have a particle diameter of 10 nm or less, or 6 nm or less, the surface area of particles is further increased, and thus the hollow metal nano particles are advantageous in that the applicability which may be used in various fields is further broadened. For example, when the hollow metal nano particles formed to have the particle diameter range are used as a catalyst, the efficiency thereof may be significantly enhanced.

According to an exemplary embodiment of the present application, the average particle diameter of the hollow metal nano particles means a value obtained by measuring 200 or more hollow metal nano particles using a graphic software (MAC-View), and measuring an average particle diameter through an obtained statistical distribution.

According to an exemplary embodiment of the present application, the hollow metal nano particles may have an average particle diameter from 1 nm to 30 nm.

According to an exemplary embodiment of the present application, the hollow metal nano particles may have an average particle diameter from 1 nm to 20 nm.

According to an exemplary embodiment of the present application, the hollow metal nano particles may have an average particle diameter from 1 nm to 15 nm.

According to an exemplary embodiment of the present application, the hollow metal nano particles may have an average particle diameter from 1 nm to 12 nm.

According to an exemplary embodiment of the present application, the hollow metal nano particles may have an average particle diameter from 1 nm to 10 nm.

According to an exemplary embodiment of the present application, the hollow metal nano particles may have an average particle diameter from 1 nm to 6 nm.

According to an exemplary embodiment of the present application, the hollow metal nano particle may include: a hollow core; and a shell portion including a first metal and a second metal.

According to an exemplary embodiment of the present application, the shell portion may include: at least one first shell including a first metal; and at least one second shell including a second metal. The second shell may be present in at least one region of the outer surface of the first shell, and may be present in the form of surrounding the entire surface of the outer surface of the first shell. When the second shell is present in some regions of the outer surface of the first shell, the second shell may also be present in the form of a discontinuous surface.

Alternatively, according to an exemplary embodiment of the present specification, the shell portion may include at least one shell including a first metal and a second metal. Specifically, the hollow metal nano particle may include: a hollow core; and at least one shell including a first metal and a second metal.

In an exemplary embodiment of the present application, the shell portion may have a thickness more than 0 nm and 5 nm or less, more specifically, more than 0 nm and 3 nm or less. Furthermore, according to an exemplary embodiment of the present specification, the shell portion may have a thickness more than 1 nm and 2 nm or less.

For example, the hollow metal nano particles may have an average particle diameter of 30 nm or less, and the shell portion may have a thickness more than 0 nm and 5 nm or less. More specifically, the hollow metal nano particles may have an average particle diameter of 20 nm or less, or 10 nm or less, and the shell portion may have a thickness more than 0 nm and 3 nm or less. According to an exemplary embodiment of the present application, the hollow metal nano particles may have a particle diameter from 1 nm to 10 nm, specifically, from 1 nm to 4 nm. Furthermore, each shell may have a thickness from 0.25 nm to 5 nm, specifically, from 0.25 nm to 3 nm.

The shell portion may also be a shell formed by mixing the first metal and the second metal, and may be a plurality of shells including the first shell and the second shell which are separately formed by varying the mixing ratio of the first metal and the second metal. Alternatively, the shell portion may be a plurality of shells including the first shell including only the first metal and the second shell including only the second metal.

According to an exemplary embodiment of the present application, a volume of the hollow portion may be 50% by volume or more of, specifically 70% by volume or more of, and more specifically 80% by volume or more of the total volume of the hollow metal nano particle.

The hollow metal nano particles supported on a carrier, which are fabricated by the fabrication method of the present application, may be used while being replaced with the existing nano particles in the field in which nano particles may be generally used. The hollow metal nano particles supported on a carrier according to the present application have much smaller sizes and wider specific surface areas than the nano particles in the related art, and thus may exhibit better activity than the nano particles in the related art. Specifically, the hollow metal nano particles supported on a carrier according to the present application may be used in various fields such as a catalyst, drug delivery, and a gas sensor. The hollow metal nano particles supported on a carrier may be used as a catalyst, or as an active material formulation in cosmetics, pesticides, animal nutrients, or food supplements, and may be used as a pigment in electronic products, optical elements, or polymers.

An exemplary embodiment of the present application provides hollow metal nano particles supported on a carrier, which are fabricated by the fabrication method.

The hollow metal nano particles according to an exemplary embodiment of the present application may be hollow metal nano particles supported on a carrier, which include at least one shell including: a hollow core; and a first metal and/or a second metal.

In an exemplary embodiment of the present application, the shell may have a single layer, and two or more layers.

In an exemplary embodiment of the present application, when the shell has a single layer, the first metal and the second metal may be present in a mixed form. In this case, the first metal and the second metal may be mixed uniformly or non-uniformly.

In an exemplary embodiment of the present application, when the shell has a single layer, the atomic percentage ratio of the first metal to the second metal of the shell may be 1:5 to 10:1.

In an exemplary embodiment of the present application, when the shell has a single layer, the first metal and the second metal in the shell may be present in a state of gradation, the first metal may be present in an amount of 50% by volume or more, or 70% by volume or more at a portion adjacent to the hollow core in the shell, and the second metal may be present in an amount of 50% by volume or more or 70% by volume or more at a surface portion adjacent to the outside in the shell.

In an exemplary embodiment of the present application, when the shell has a single layer, the shell may include only the first metal or the second metal.

In an exemplary embodiment of the present application, the hollow metal nano particles supported on a carrier may include a hollow core, a first shell including a first metal formed throughout the outer surface of the hollow core, and a second shell including a second metal formed throughout the outer surface of the first shell. Alternatively, in an exemplary embodiment of the present application, the hollow metal nano particles supported on a carrier may include a shell of a single layer including a first metal and a second metal which are formed throughout the outer surface of the hollow core. In this case, the hollow metal nano particles may also include a surfactant having positive charges in the hollow core.

In an exemplary embodiment of the present application, the hollow metal nano particles supported on a carrier may include a hollow core, a first shell in which a first metal salt carrying positive charges is present in at least one region of the outer portion of hollow portions, and a second shell in which a second metal carrying negative charges is present in at least one region of the outer surface of the first shell. In this case, the hollow metal nano particles may also include a surfactant having negative charges in the hollow core.

According to an exemplary embodiment of the present specification, the hollow metal nano particles may have a dispersion degree from 20% to 50%, or from 20% to 40%. Specifically, according to an exemplary embodiment of the present specification, the hollow metal nano particles may have a dispersion degree from 25% to 40%, or from 25% to 35%.

According to an exemplary embodiment of the present specification, an AutoChem II 2920 device manufactured by Micromeritics Instrument Co., Ltd., was used in order to measure the dispersion degree of the hollow metal nano particles. Specifically, the device was used in order to measure the dispersion degree, and a sample was subjected to pre-treatment at 400° C., pulse dosing was performed by using CO as an adsorption gas to saturate the sample with CO, the dosing was stopped, and the amount of CO adsorbed was calculated.

According to an exemplary embodiment of the present application, the dispersion degree of the hollow metal nano particles may be calculated as follows.

Dispersion degree (%)={Chemisorption site/Supported metal atomicity}×100

The dispersion degree shows the ratio of hollow metal nano particles exposed to the surface on the carrier, meaning that the ratio of hollow metal nano particles exposed to the surface of the carrier is high when the value is high. That is, a higher value of the dispersion degree may mean that the hollow metal nano particles supported on a carrier are uniformly dispersed.

BEST MODE

Hereinafter, the present specification will be described in detail with reference to Examples for specific description. However, the Examples according to the present application may be modified in various forms, and the scope of the present application is not interpreted as being limited to the Examples described in detail below. The Examples of the present specification are provided for more completely explaining the present specification to those skilled in the art.

Example 1

0.03 mmol of $Ni(NO_3)_2$ as a first metal salt, 0.01 mmol of $K_2PtCl_4$ as a second metal salt, 0.12 mmol of trisodium citrate as a stabilizer, and 0.48 mmol of sodium dodecylsulfate (SDS) as an anionic surfactant were added to and dissolved in 30 ml of distilled water to form a solution, and the solution was stirred for 30 minutes. In this case, the molar ratio of $Ni(NO_3)_2$ to $K_2PtCl_4$ was 3:1, and in this case, the concentration of the SDS calculated was approximately two times the critical micelle concentration (CMC) to water.

Subsequently, 6 mg of carbon black (Vulcan XC 72) was added to the solution, and dispersed in the solution by stirring the solution for 30 minutes.

Subsequently, 0.16 mmol of $NaBH_4$ as a reducing agent was added to the solution and the mixture was left to react for 30 minutes. After the mixture was centrifuged at 10,000 rpm for 10 minutes, the supernatant in the upper layer was discarded, the remaining precipitate was re-dispersed in 20 ml of water, and then the centrifugation process was repeated once more to fabricate hollow metal nano particles composed of a hollow core and a shell, which were supported on a carbon support.

Figure 2:
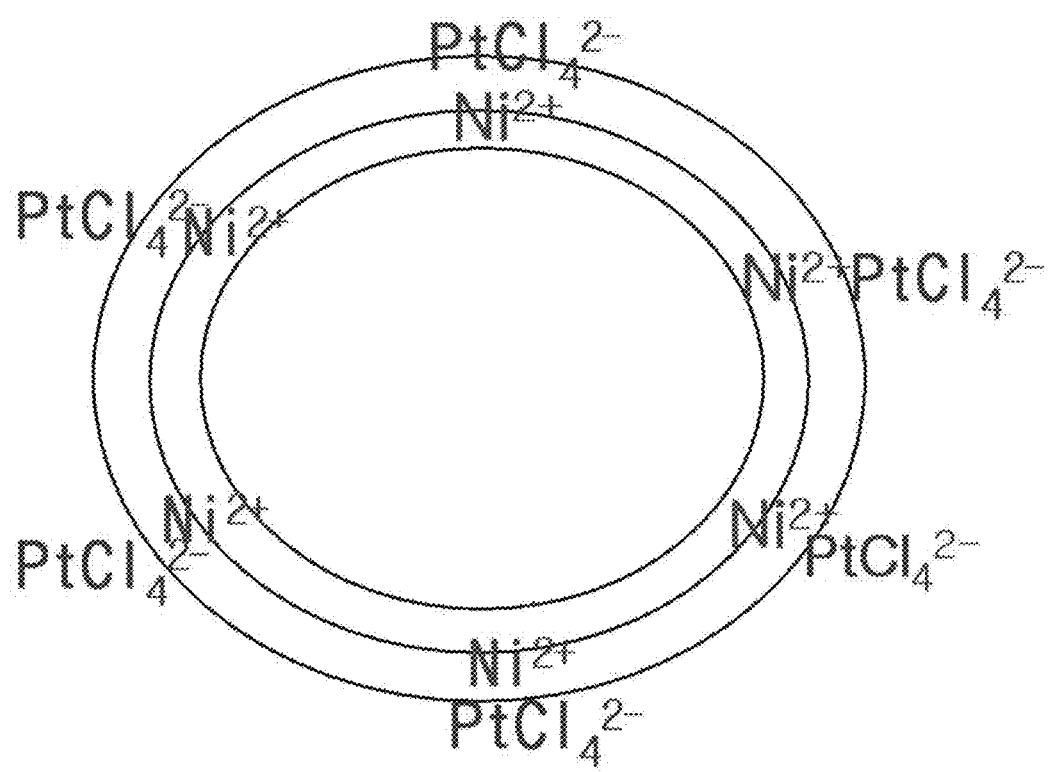
FIG. 2 illustrates a model of hollow metal nano particles, from which a surfactant is removed, among the hollow metal nano particles supported on a carrier which are fabricated according to Example 1.

FIG. 1 illustrates a model of hollow metal nano particles, which includes a surfactant, among the hollow metal nano particles supported on a carrier which are fabricated according to Example 1, and FIG. 2 illustrates a model of hollow metal nano particles, from which a surfactant is removed, among the hollow metal nano particles supported on a carrier which are fabricated according to Example 1.

Figure 7:
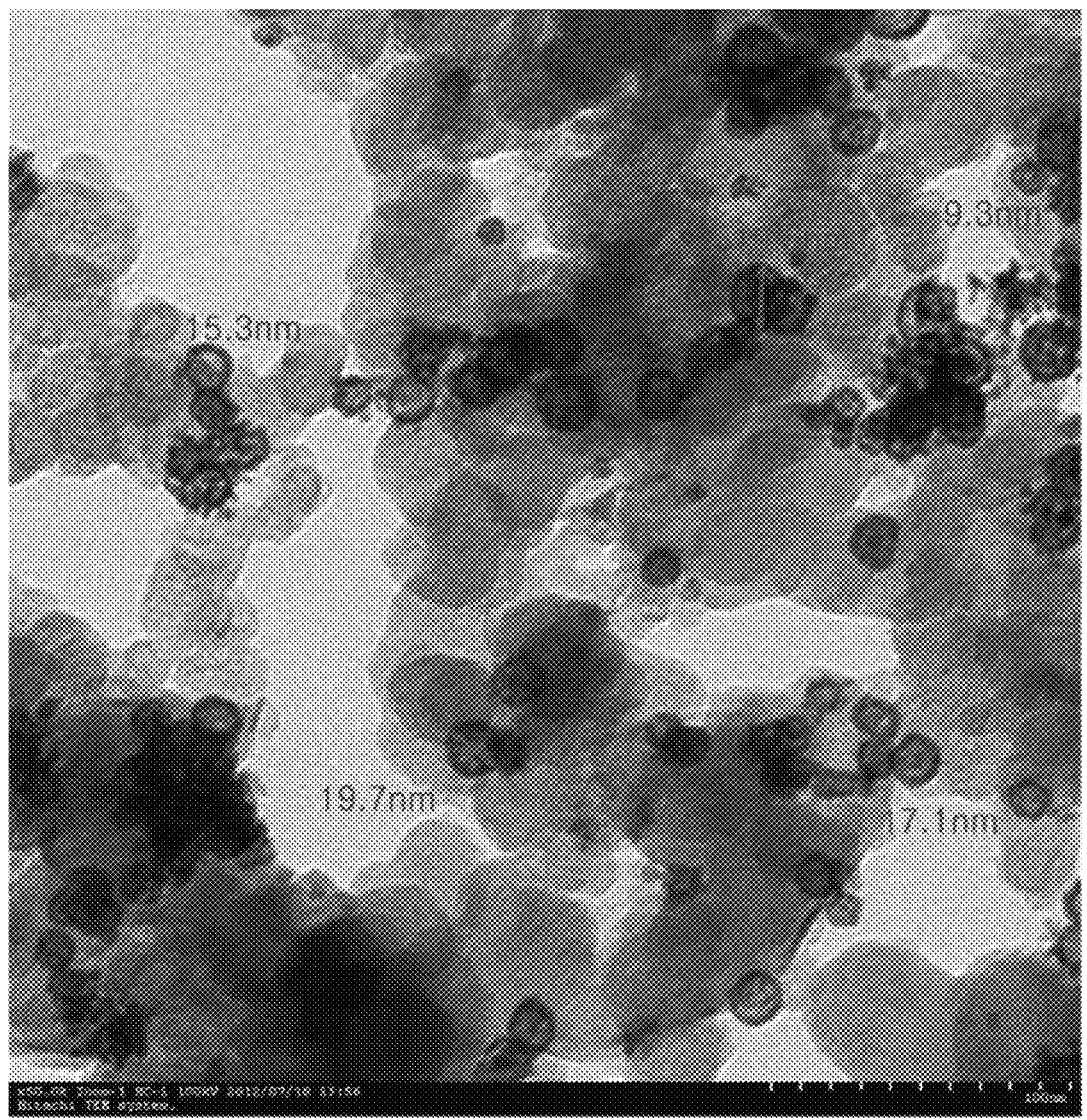
FIG. 7 illustrates a transmission electron microscope (TEM) image of the hollow metal nano particles supported on a carrier, which are fabricated according to Example 1.
Figure 8:
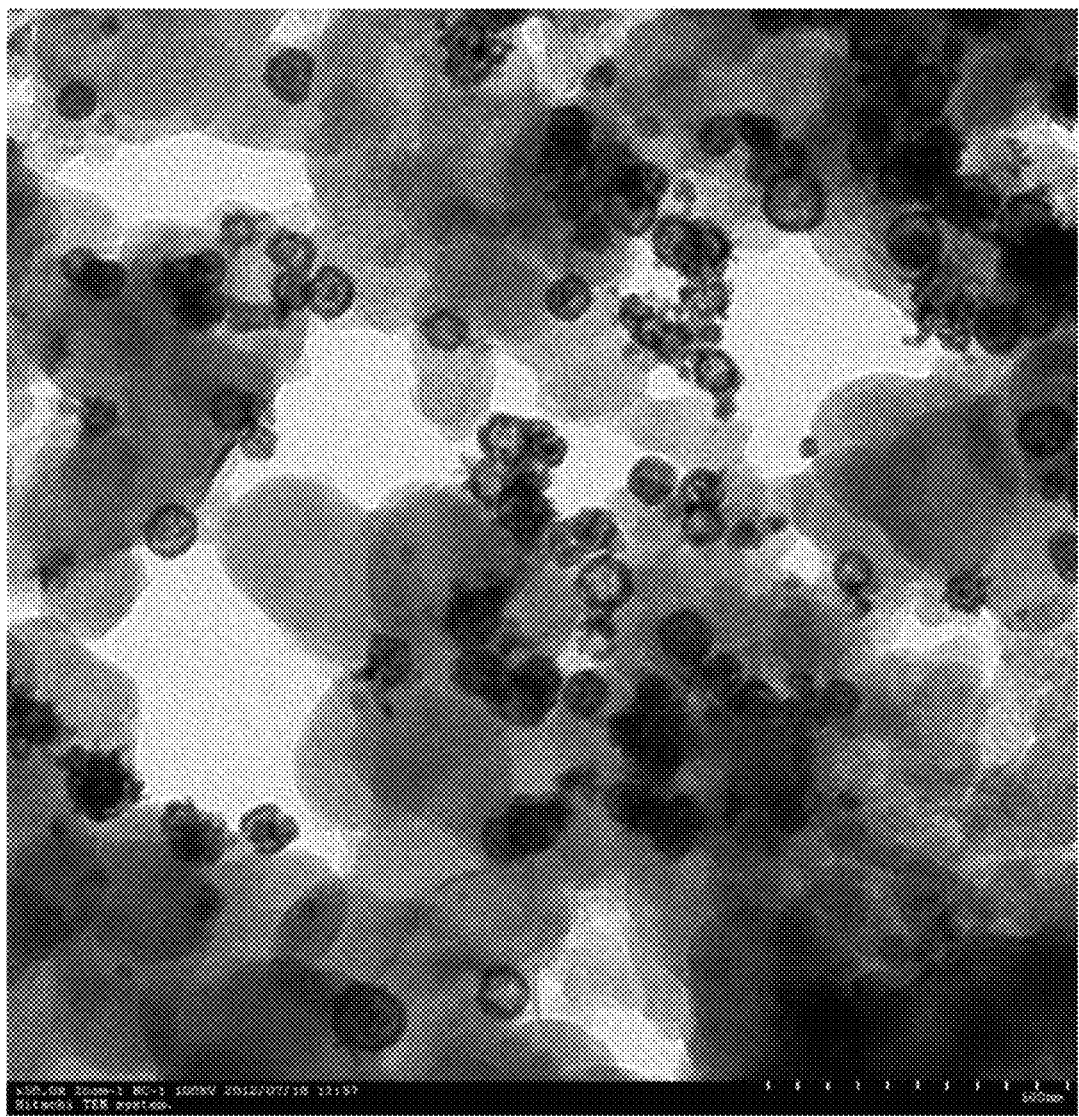
FIG. 8 illustrates a transmission electron microscope (TEM) image of the hollow metal nano particles supported on a carrier, which are fabricated according to Example 1.

FIGS. 7 and 8 illustrate a transmission electron microscope (TEM) image of the hollow metal nano particles supported on a carrier, which are fabricated according to Example 1. When the particle diameter of the hollow metal nano particles is measured from the HR-TEM result of FIG. 7, the particle diameter was 9.3 nm, 15.3 nm, 17.1 nm, 19.5 nm, and 19.7 nm, and thus, it can be confirmed that particles with a particle diameter of approximately 20 nm or less and 10 nm are also present. The particle diameter of hollow metal nano particles formed was measured on 200 or more hollow metal nano particles using a graphic software (MAC-View) based on FIG. 5, the average particle diameter was 15 nm through a statistical distribution obtained, and the standard deviation was calculated as 5 nm.

The dispersion degree of the hollow metal nano particles supported on a carrier, which were fabricated according to Example 1, was 35%.

In order to measure the dispersion degree, an AutoChem II 2920 device manufactured by Micromeritics Instrument Co., Ltd., was used, and CO was used as an adsorption gas.

Example 2

0.01 mmol of $K_2PtCl_4$ as a first metal salt, 0.01 mmol of $NiCl_2$ as a second metal salt, and 0.02 mmol of cetyltrimethylammonium bromide (CTAB) as a cationic surfactant were added to and dissolved in 20 ml of distilled water to form a solution, and the solution was stirred for 30 minutes. In this case, the molar ratio of $K_2PtCl_4$ to $NiCl_2$ was 1:1, and in this case, the concentration of the CTAB calculated was approximately one time the critical micelle concentration (CMC) to water.

Subsequently, 6 mg of carbon black (Vulcan XC 72) was added to the solution, and dispersed in the solution by stirring the solution for 30 minutes.

Subsequently, 0.2 mmol of $NaBH_4$ as a reducing agent and 2 ml of distilled water were added to the solution and the mixture was left to react for 30 minutes. After the mixture was centrifuged at 10,000 rpm for 10 minutes, the supernatant in the upper layer was discarded, the remaining precipitate was re-dispersed in 20 ml of water, and then the centrifugation process was repeated once more to fabricate hollow metal nano particles composed of a hollow core and a shell, which were supported on a carbon support.

Figure 3:
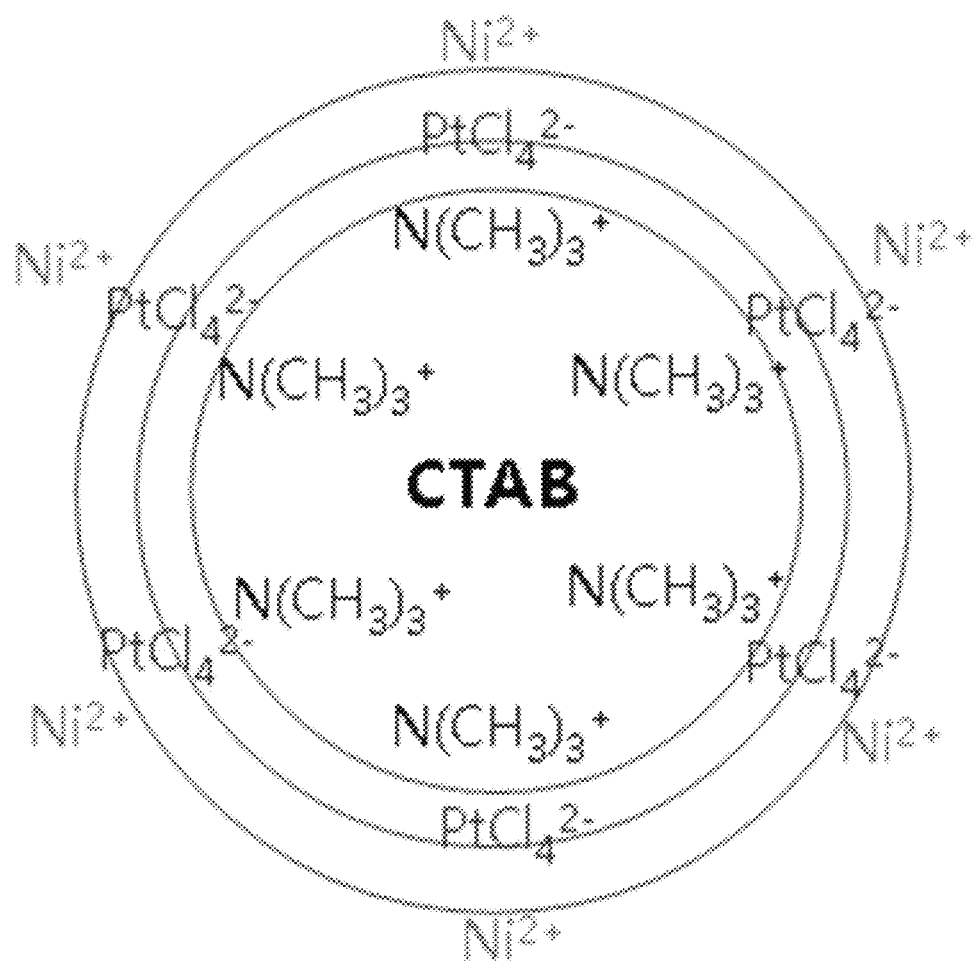
FIG. 3 illustrates a model of hollow metal nano particles, which includes a surfactant, among hollow metal nano particles supported on a carrier which are fabricated according to Example 2.
Figure 4:
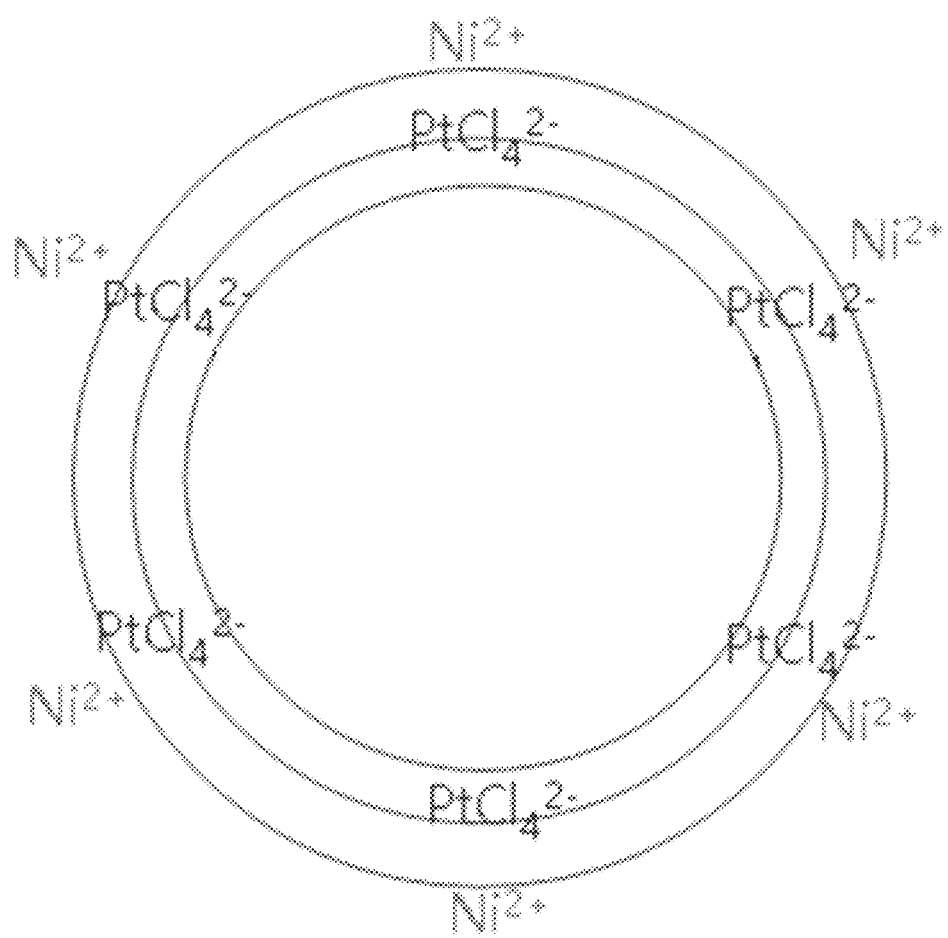
FIG. 4 illustrates a model of hollow metal nano particles, from which a surfactant is removed, among the hollow metal nano particles supported on a carrier which are fabricated according to Example 2.
Figure 11:
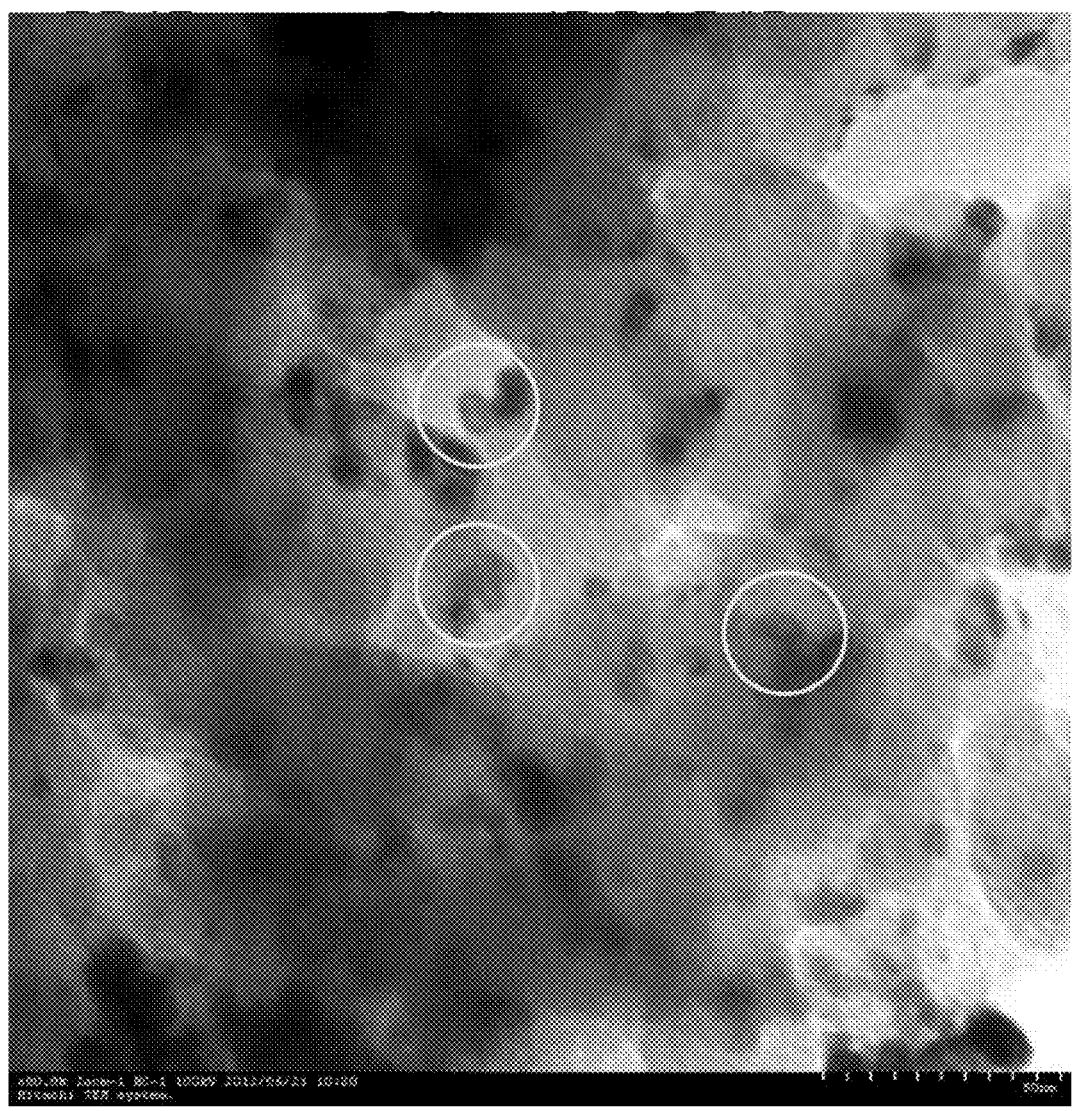
FIG. 11 illustrates a transmission electron microscope (TEM) image of the hollow metal nano particles supported on a carrier, which are fabricated according to Example 2.

FIG. 3 illustrates a model of hollow metal nano particles, which includes a surfactant, among the hollow metal nano particles supported on a carrier which are fabricated according to Example 2, and FIG. 4 illustrates a model of hollow metal nano particles, from which a surfactant is removed, among the hollow metal nano particles supported on a carrier which are fabricated according to Example 2. Furthermore, FIG. 11 illustrates a transmission electron microscope (TEM) image of the hollow metal nano particles supported on a carrier, which are fabricated according to Example 2.

The dispersion degree of the hollow metal nano particles supported on a carrier, which were fabricated according to Example 2, was 28%.

In order to measure the dispersion degree, an AutoChem II 2920 device manufactured by Micromeritics Instrument Co., Ltd., was used, and CO was used as an adsorption gas.

Example 3

0.03 mmol of $Ni(NO_3)_2$ as a first metal salt, 0.01 mmol of $K_2PtCl_4$ as a second metal salt, 0.12 mmol of trisodium citrate as a stabilizer, and 0.02 mmol of ammonium lauryl sulfate (ALS) as an anionic surfactant were added to and dissolved in 26 ml of distilled water to form a solution, and the solution was stirred for 30 minutes. In this case, the molar ratio of $Ni(NO_3)_2$ to $K_2PtCl_4$ was 3:1, and in this case, the concentration of the ALS calculated was approximately two times the critical micelle concentration (CMC) to water.

Subsequently, 6 mg of carbon black (Vulcan XC 72) was added to the solution, and dispersed in the solution by stirring the solution for 30 minutes.

Subsequently, 0.16 mmol of $NaBH_4$ as a reducing agent was added to the solution and the mixture was left to react for 30 minutes. After the mixture was centrifuged at 10,000 rpm for 10 minutes, the supernatant in the upper layer was discarded, the remaining precipitate was re-dispersed in 20 ml of water, and then the centrifugation process was repeated once more to fabricate hollow metal nano particles composed of a hollow core and a shell, which were supported on a carbon support.

Figure 9:
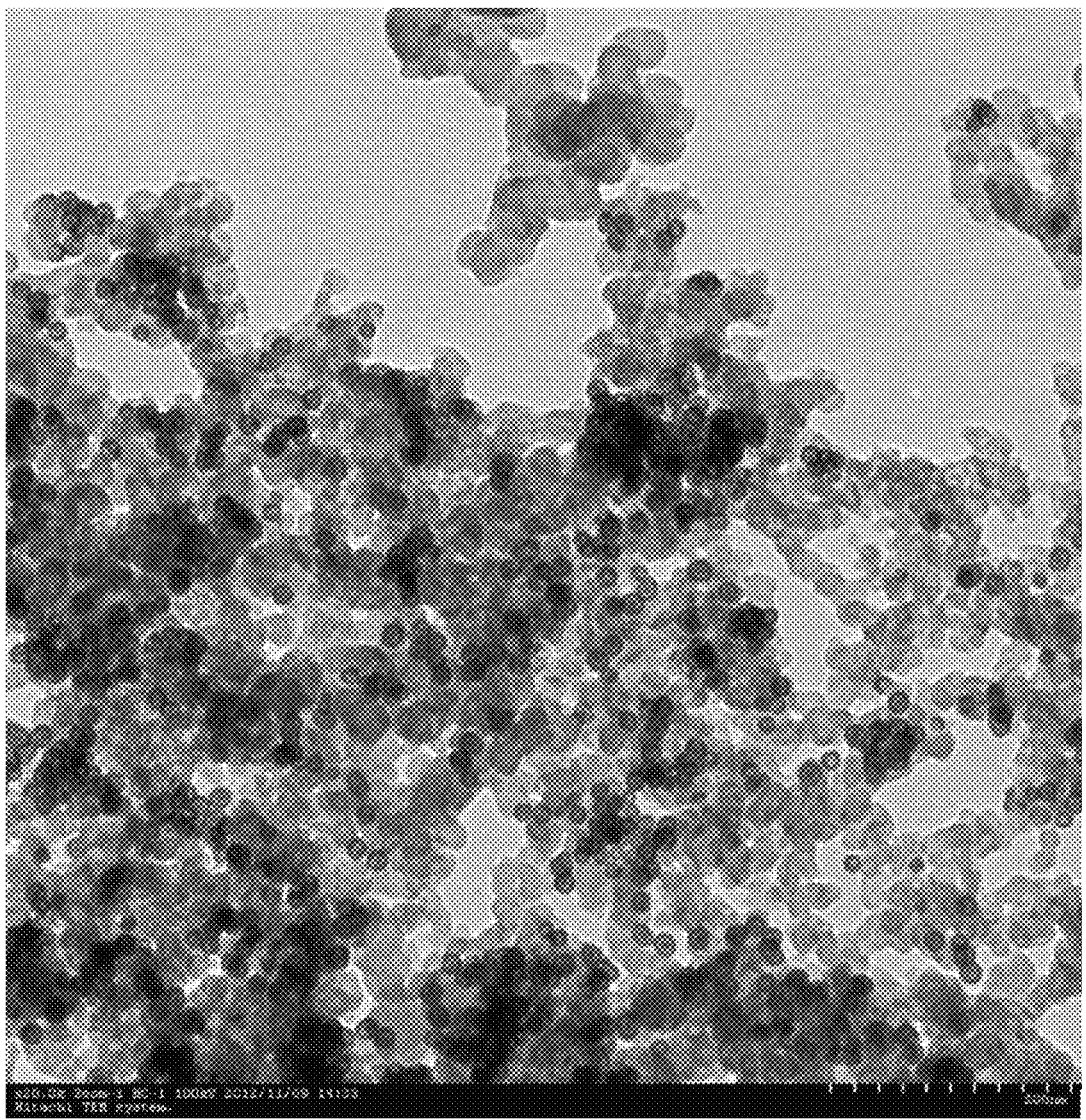
FIG. 9 illustrates a transmission electron microscope (TEM) image of the hollow metal nano particles supported on a carrier, which are fabricated according to Example 3.

FIG. 9 illustrates a transmission electron microscope (TEM) image of the hollow metal nano particles supported on a carrier, which are fabricated according to Example 3.

The dispersion degree of the hollow metal nano particles supported on a carrier, which were fabricated according to Example 3, was 33%.

In order to measure the dispersion degree, an AutoChem II 2920 device manufactured by Micromeritics Instrument Co., Ltd., was used, and CO was used as an adsorption gas.

Example 4

Instead of fabricating hollow metal nano particles by adding a reducing agent after the hollow metal nano particles were supported on carbon black in Example 3, hollow metal nano particles were fabricated by adding a reducing agent, and then were supported on carbon black in Example 4. The specific explanation is as follows.

0.03 mmol of $Ni(NO_3)_2$ as a first metal salt, 0.01 mmol of $K_2PtCl_4$ as a second metal salt, 0.12 mmol of trisodium citrate as a stabilizer, and 0.02 mmol of ammonium lauryl sulfate (ALS) as an anionic surfactant were added to and dissolved in 26 ml of distilled water to form a solution, and the solution was stirred for 30 minutes. In this case, the molar ratio of $Ni(NO_3)_2$ to $K_2PtCl_4$ was 3:1, and in this case, the concentration of the ALS calculated was approximately two times the critical micelle concentration (CMC) to water.

Subsequently, 0.16 mmol of $NaBH_4$ as a reducing agent was added to the solution and the mixture was left to react for 30 minutes, thereby fabricating hollow nano particles. 6 mg of carbon black (Vulcan XC 72) was added to the hollow nano particle solution prepared, and dispersed in the solution by stirring the solution for 30 minutes. After the mixture was centrifuged at 10,000 rpm for 10 minutes, the supernatant in the upper layer was discarded, the remaining precipitate was re-dispersed in 20 ml of water, and then the centrifugation process was repeated once more to fabricate hollow metal nano particles composed of a hollow core and a shell, which were supported on a carbon support.

Figure 10:
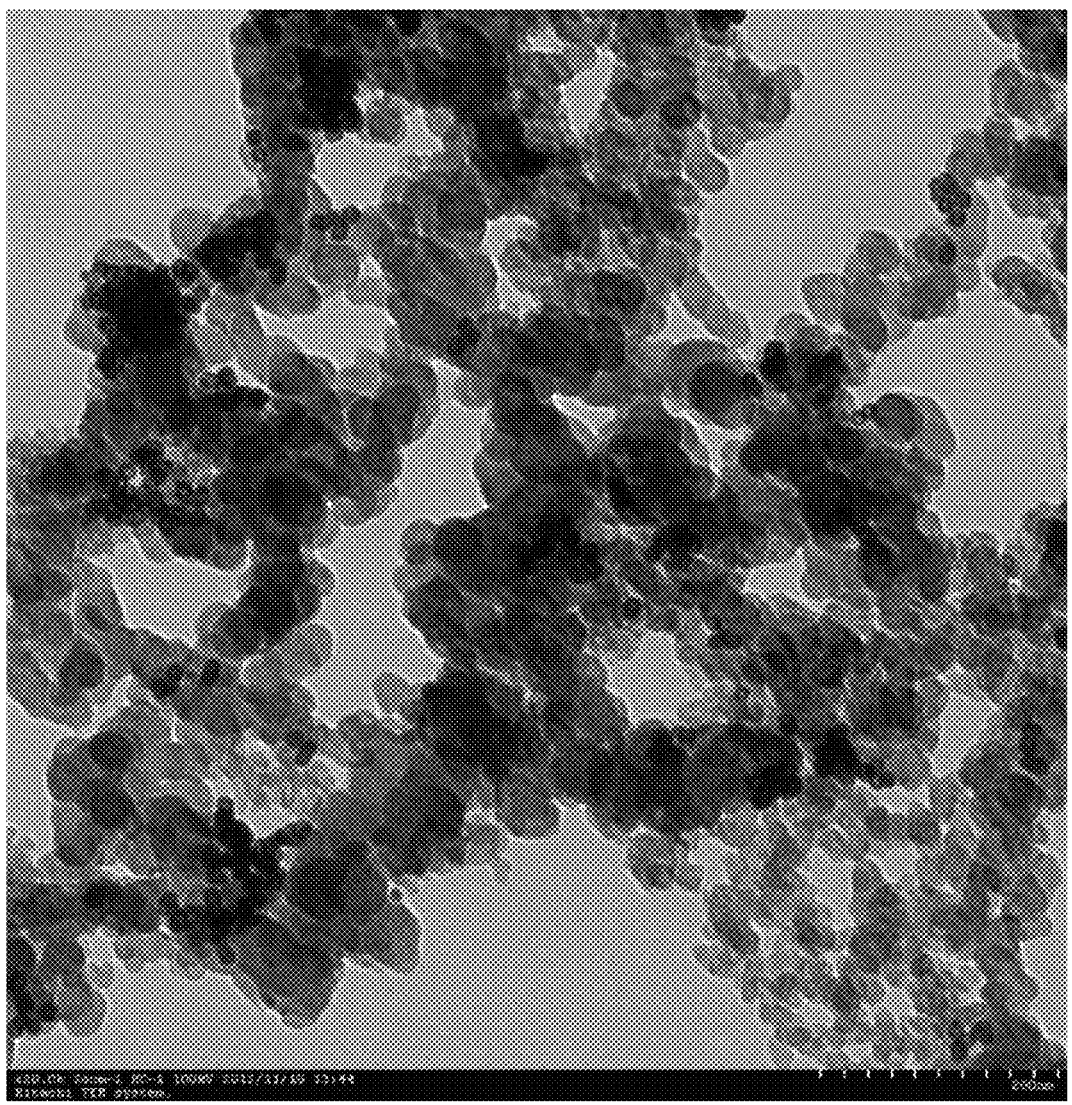
FIG. 10 illustrates a transmission electron microscope (TEM) image of the hollow metal nano particles supported on a carrier, which are fabricated according to Example 4.

FIG. 10 illustrates a transmission electron microscope (TEM) image of the hollow metal nano particles supported on a carrier, which are fabricated according to Example 4. In this case, the size of the particle diameter was 20 nm. The dispersion degree of the hollow metal nano particles supported on a carrier, which were fabricated according to Example 4, was 24%.

In order to measure the dispersion degree, an AutoChem II 2920 device manufactured by Micromeritics Instrument Co., Ltd., was used, and CO was used as an adsorption gas.

Figure 5:
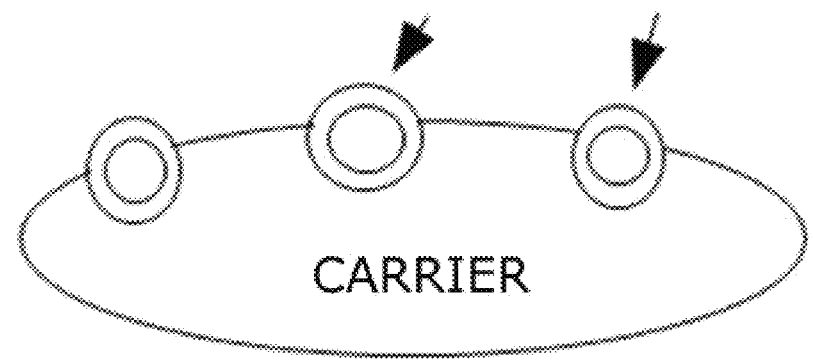
FIG. 5 illustrates a cross section of a carrier on which hollow metal nano particles fabricated according to Examples 1 to 4 are supported.
Figure 6:
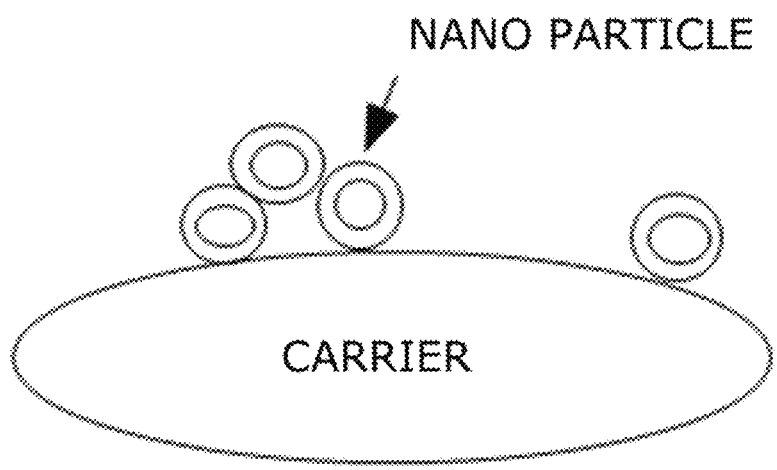
FIG. 6 illustrates that general nano particles supported on a carrier are aggregated on the carrier.

FIG. 5 illustrates a cross section of a carrier on which the hollow metal nano particles fabricated according to Examples 1 to 4 are supported. Furthermore, FIG. 6 illustrates that general nano particles supported on a carrier are aggregated on the carrier.

Examples of the present invention have been described with reference to the accompanying drawings, but the present invention is not limited to the Examples and may be prepared in various forms, and it will be understood by a person with ordinary skill in the art, to which the present invention pertains, that the present invention may be carried out in other specific forms without modifying the technical spirit or essential feature of the present invention. Therefore, it is to be appreciated that the Examples described above are illustrative in every sense, and not restrictive.

The invention claimed is:

1. A method for fabricating catalyst comprising hollow metal nano particles supported on a carrier, the method comprising:
    forming a solution by adding a first metal salt, a second metal salt, and a surfactant to a solvent which consists of water;
    forming hollow metal nano particles having an average particle diameter of 30 nm or less by adding a reducing agent to the solution; and
    supporting the hollow metal nano particles on a carrier,
    wherein the forming of the solution comprises forming a micelle by the surfactant, and surrounding the outside of the micelle by the first metal salt and the second metal salt,
    the forming of the hollow metal nano particles comprises forming the micelle region to a hollow form, and
    a concentration of the surfactant in the solution is 0.2 time to 5 times a critical micelle concentration (CMC) to water.

2. The method of claim 1, wherein the supporting of the hollow metal nano particles on a carrier comprises adding the carrier after the forming of the hollow metal nano particles.

3. The method of claim 1, wherein the carrier is a carbon-based material or an inorganic fine particle.

4. The method of claim 1, wherein a carbon number of the chains of the surfactant is 15 or less.

5. The method of claim 1, wherein the surfactant is an anionic surfactant.

6. The method of claim 5, wherein the anionic surfactant comprises $NH_4^+$, $K^+$, $Na^+$, or $Li^+$ as a counter ion.

7. The method of claim 1, wherein the surfactant is a cationic surfactant.

8. The method of claim 7, wherein the cationic surfactant comprises $I^-$, $Br^-$, or $Cl^-$ as a counter ion.

9. The method of claim 1, wherein the forming of the solution comprises further adding a non-ionic surfactant.

10. The method of claim 1, wherein the forming of the solution comprises further adding a stabilizer.

11. The method of claim 1, wherein the first metal of the first metal salt and the second metal of the second metal salt are each independently selected from the group consisting of metals belonging to Group 3 to Group 15 of the periodic table, metalloids, lanthanide metals, and actinide metals.

12. The method of claim 1, wherein the first metal of the first metal salt and the second metal of the second metal salt are each independently selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W)), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

13. The method of claim 1, wherein each of the first metal salt and the second metal salt is nitrate, halide, hydroxide, or sulfate of the first metal and the second metal.

14. The method of claim 1, wherein a molar ratio of the first metal salt to the second metal salt in the solution is 1:5 to 10:1.

15. The method of claim 1, wherein the fabrication method is carried out at room temperature.

16. The method of claim 1, wherein the reducing agent has a standard reduction potential of −0.23 V or less.

17. The method of claim 1, wherein a particle diameter of the hollow metal nano particles is within a range from 80% to 120% of an average particle diameter of the hollow metal nano particles.

18. The method of claim 1, further comprising:
after the forming of the hollow metal nano particles, removing the surfactant inside the hollow metal nano particles.

19. The method of claim 1, wherein the hollow metal nano particles have an average particle diameter of 20 nm or less.

20. The method of claim 1, wherein the hollow metal nano particles have a spherical shape.

21. The method of claim 1, wherein a volume of the hollow portion is 50% by volume or more of a total volume of the hollow metal nano particle.

22. The method of claim 1, wherein the hollow metal nano particle comprises: a hollow core; and a shell portion comprising a first metal and a second metal.

23. The method of claim 22, wherein the shell portion comprises: at least one first shell comprising a first metal; and at least one second shell comprising a second metal.

24. The method of claim 22, wherein the shell portion comprises at least one shell comprising a first metal and a second metal.

25. The method of claim 22, wherein the shell portion has a thickness of 5 nm or less.

26. A method for fabricating catalyst comprising hollow metal nano particles supported on a carrier, the method comprising:
forming a composition by adding a carrier, a first metal salt, a second metal salt, and a surfactant to a solvent which consists of water; and
forming hollow metal nano particles supported on the carrier by adding a reducing agent to the composition,
wherein the forming of the solution comprises forming a micelle by the surfactant, and surrounding the outside of the micelle by the first metal salt and the second metal salt,
the hollow metal nano particle comprises a hollow form formed by the micelle region,
the hollow metal nano particles have an average particle diameter of 30 nm or less, and
a concentration of the surfactant in the solution is 0.2 time to 5 times a critical micelle concentration (CMC) to water.

27. The method of claim 26, wherein the forming of the composition is mixing the carrier with a solution formed by adding the first metal salt, the second metal salt and the surfactant to the solvent which consists of water.

28. The method of claim 26, wherein the forming of the composition is adding the carrier to a solution formed by adding the first metal salt, the second metal salt and the surfactant to the solvent which consists of water and dispersing the composition.

29. The method of claim 26, wherein the carrier is a carbon-based material or an inorganic fine particle.

30. The method of claim 26, wherein the surfactant is an anionic surfactant.

31. The method of claim 30, wherein the anionic surfactant comprises $NH_4^+$, $K^+$, $Na^+$, or $Li^+$ as a counter ion.

32. The method of claim 26, wherein the surfactant is a cationic surfactant.

33. The method of claim 32, wherein the cationic surfactant comprises $I^-$, $Br^-$, or $Cl^-$ as a counter ion.

34. The method of claim 26, wherein the forming of the solution comprises further adding a non-ionic surfactant.

35. The method of claim 26, wherein the forming of the solution comprises further adding a stabilizer.

36. The method of claim 26, wherein the first metal of the first metal salt and the second metal of the second metal salt are each independently selected from the group consisting of metals belonging to Group 3 to Group 15 of the periodic table, metalloids, lanthanide metals, and actinide metals.

37. The method of claim 26, wherein the first metal of the first metal salt and the second metal of the second metal salt are each independently selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W)), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

38. The method of claim 26, wherein each of the first metal salt and the second metal salt is nitrate, halide, hydroxide, or sulfate of the first metal and the second metal.

39. The method of claim 26, wherein a molar ratio of the first metal salt to the second metal salt in the solution is 1:5 to 10:1.

40. The method of claim 26, wherein the fabrication method is carried out at room temperature.

41. The method of claim 26, wherein the reducing agent has a standard reduction potential of −0.23 V or less.

42. The method of claim 26, wherein a particle diameter of the hollow metal nano particles is within a range from 80% to 120% of an average particle diameter of the hollow metal nano particles.

43. The method of claim 26, further comprising:
after the forming of the hollow metal nano particles, removing the surfactant inside the hollow metal nano particles.

44. The method of claim 26, wherein the hollow metal nano particles have an average particle diameter of 20 nm or less.

45. The method of claim 26, wherein the hollow metal nano particles have a spherical shape.

46. The method of claim 26, wherein a volume of the hollow portion is 50% by volume or more of a total volume of the hollow metal nano particle.

47. The method of claim 26, wherein the hollow metal nano particle comprises: a hollow core; and a shell portion comprising a first metal and a second metal.

48. The method of claim 47, wherein the shell portion comprises: at least one first shell comprising a first metal; and at least one second shell comprising a second metal.

49. The method of claim 47, wherein the shell portion comprises at least one shell comprising a first metal and a second metal.

50. The method of claim 47, wherein the shell portion has a thickness of 5 nm or less.

51. The method of claim 26, wherein a carbon number of the chains of the surfactant is 15 or less.

* * * * *